3,125,541
METHOD FOR LEACHING A POLYURETHANE FOAM

Charles C. L. Hwa, Granville, and Daniel W. McNeil, Columbus, Ohio, assignors to Owens-Corning Fiberglas Corporation, a corporation of Delaware
No Drawing. Filed Oct. 18, 1960, Ser. No. 63,279
4 Claims. (Cl. 260—2.5)

The present invention relates to methods and materials for the leaching of polyurethane resin foams and particularly to improved leaching methods and materials which comprise a basic leaching composition and an organic hydroxy compound.

The utilization of polyurethane foams as filter media has gained recent and widespread popularity in view of the availability, economy and formability of these materials. Since most polyurethane foams are closed cell structures and accordingly so impervious as to be useless in applications such as filtering, wherein liquids or gases must readily pass through the media, the polyurethane foams must be modified or transformed in order to attain the requisite porosity or permeability.

The conventional method for transforming the closed cell polyurethanes to an open celled condition comprises a leaching technique wherein the foams are immersed in a boiling or near boiling basic solution. In this approach, the foams are partially leached to remove the majority of cell walls while leaving the cell junctures or interstices intact to provide an integral, skeletal structure characterized by an open celled condition and an attendant porosity or perviosity.

Successful leaching should achieve a completely open celled foam which is further characterized by the substantially complete removal of partial membranes or cell walls, rather than merely a 100% open celled foam in which all of the cells are interconnected by apertures, but in which the majority of cell walls or partial membranes are intact.

While the basic or alkaline leaching technique provides an adequate filter medium in most cases, it is attended by a variety of drawbacks in the form of process variations, personnel hazards, equipment deterioration, expense stemming from the high temperatures necessitated, and the slowness of leaching.

The alkaline leaching of polyurethane foams is fraught by process variations in that uniform leaching of the foams under the same conditions of temperature and leaching solution is not always attained.

In addition, satisfactory leaching is not achieved within a reasonable time limit at moderate temperatures. For example, at room temperature, a complete or adequate leaching cannot be achieved. Even when the treating temperature is elevated to temperatures as high as 75° C., adequate leaching entails a leaching period of as long as 30–60 minutes and the leaching period is particularly long in the case of polyether based polyurethane foams. To reduce the time require for satisfactory leaching, the temperature is conventionally raised to 95–100° C. However, at these temperatures, personnel hazards stemming from the corrosive and noxious characteristics of the caustic solution are considerable and the corrosive deterioration of the apparatus is accelerated. In addition, the requisite heating adds to the processing cost and results in a thermal weakening of less dense leached foams. This thermal weakening is distinct from the leaching effect which merely removes cell walls since the former serves to diminish the over-all strength or integrity of the skeletal structures resulting from the leaching.

It is an object of the present invention to provide improved leaching methods and compositions for the leaching of polyurethane foams.

A further object is the provision of leaching compositions which enable the preparation of open celled polyurethane foams, suitable for use as filter structures, at moderate temperatures and with short leaching periods.

Another object is the provision of methods whereby polyurethane resin foams may be leached to an extent whereby they are rendered adequately porous for utilization as filtering media without resort to high leaching temperatures or prolonged leaching treatments.

Still another object is the provision of leached polyurethane foams which exhibit a porosity and integrity adequate for utilization as filtering media.

The aforegoing objects are achieved by the present invention by means of the employment of leaching compositions which comprise solutions of alkaline materials and hydroxyl substituted aliphatic hydrocarbons.

It is believed that the technique of the invention achieves a completely open celled foam which is further characterized by the substantially complete removal of partial membranes or cell walls as the result of a quasi-mechanical, preferential removal of the thinner cell wall segments by means of a conventional leaching composition in combination with a solvent which serves to weaken, but not to damage the structural integrity of the foam. Accordingly, the alkaline attack upon the foam is enhanced.

The alkaline leaching materials employed are conventional solutions and may be selected from a broad range of candidates including alkali salts or hydroxides, ammonium compounds, phosphates, sulfates, sulfides and other basic compounds. However, a 10–40% concentration of sodium hydroxide is preferred.

The solvents utilized are organic hydroxy compounds which are soluble in the alkaline leaching compound and yet inert to the leaching material so that the alkalinity of the mixture is not decreased through the reaction of the alkaline and hydroxy compounds although it may be diluted by the hydroxy compound. While methanol is preferred for reasons of economy, other hydroxyl substituted aliphatic hydrocarbons such as other aliphatic alcohols, glycols, substituted alcohols and the like may be employed. Due to damage which may be incurred by the resin foams when the hydroxy compound is employed in a ratio of more than 1:1, it is preferred that not more than one part by weight of the organic hydroxy compound be employed for each part of the caustic solution and that preferably two parts of alkaline solution be employed with each part of the hydroxy compound.

Through the use of the methods and materials of the invention, polyurethane resin foams which formerly required a 30 minute leaching at 75° C. can now be adequately leached in 3 to 7 minutes. In addition, the boiling or near boiling caustic baths which were formerly necessary are now obviated and entirely satisfactory leaching may be conducted at moderate temperatures in the range of 60–75° C. Accordingly, processing costs, leaching periods, and personnel and apparatus hazards are substantially reduced.

The success of the methods and materials of the invention has been demonstrated in regard to both polyester and polyether based polyurethane foams prepared by reacting a polyisocyanate with a polyether or polyester. However, the foams which are susceptible to the invention, may be more readily described as the reaction products and polymers of polyisocyanates and organic compounds containing two or more active hydrogens such as polyesters, glycols, triols and the dicarboxylic acids.

The following examples demonstate successful leaching compositions prepared according to the invention:

*Example 1*

A methanol and sodium hydroxide leaching composition was prepared by mixing one part by weight of methanol and two parts by weight of 25% sodium hydroxide in water.

*Example 2*

An aromatic hydroxy leaching composition was prepared by mixing two parts by weight of a 25% solution of sodium hydroxide with one part by weight of phenol.

*Example 3*

A two step leaching system was prepared by preparing two separate leaching baths comprising a 30% aqueous solution of isopropanol and a 25% sodium hydroxide solution.

*Example 4*

A leaching composition was prepared by admixing four parts by weight of 25% sodium hydroxide with one part of a denatured ethyl alcohol preparation having the trade name Shellacol.

In order to determine the efficacy of the compositions and methods of the invention and to demonstrate the improvement achieved therewith, the resistance of the leached foams to air was measured and compared to that of conventional alkali leached foams as demonstrated by the table set forth below:

| Leaching Composition | Temp. (° C.) | Time (Minutes) | Air Resistance (Inches of H²O) |
|---|---|---|---|
| 25% solution of NaOH | 75 | 10 | 1.90 |
|  | 75 | 10 | 5.00 |
|  | 75 | 15 | 0.72 |
|  | 75 | 15 | 5.00 |
| Example No. 1 | 75 | 5 | 0.21 |
|  | 75 | 5 | 0.43 |
|  | 75 | 5 | 0.30 |
|  | 75 | 7 | 0.19 |
|  | 75 | 7 | 0.21 |
| Example No. 2 | 80 | 7 | 1.24 |
| Example No. 3 | 60 | 10 | 0.83 |
| Example No. 4 | 60 | 10 | 1.25 |
|  | 75 | 10 | 0.33 |

In determining the data embodied in the above table, foam discs 1 inch thick and 3.7 inches in diameter were immersed in the various leaching solutions at the specified temperatures. The foam discs were continuously subjected to alternate mechanical compression and release of such compression in order to insure complete penetration by the solutions. At the end of the specified time periods, the discs were removed from the leaching baths, squeezed and washed with water.

In the case of Example 3, a two stage leaching was employed in which the foam sample was treated first in the aqueous solution of isopropanol at room temperature for a period of three minutes and then in the 25% sodium hydroxide solution at 60° C. for ten minutes.

The foam samples were then tested for air resistance upon a manometric back pressure device comprising an open end cylinder through which air is flowed at a constant velocity and exhausted to the atmosphere. The discs were placed across the cylinder bore and their resistance to air flow was measured by a micro-manometer. Those readings which indicate a resistance in excess of 5 inches of water comprise the maximum reading upon the manometric scale employed and indicate that the air resistance was at least 5 inches of water.

The resin employed in the fabrication of the discs tested in Examples 1 through 4 was a polyether based polyurethane foam prepared by conventional methods from the following ingredients expressed in parts by weight:

Niax Triol LG56 _____ 100.0
Silicone XL-520 _____ 1.0
Water _____ 4.0
N-ethyl morpholine _____ 0.2
N,N,N',N'-tetramethyl 1,3-butane diamine ___ 0.1

Niax Triol LG56 is a propylene oxide adduct of glycerol containing substantially 90–95% secondary OH radicals, an OH number of about 56 and an average molecular weight of from 2800–3100, silicone XL-520 is an organosilicone fluid having the formula

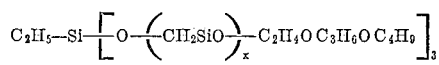

wherein the total of the 3 $x$'s is approximately 20, and prepared from a polyol which is chain stopped at one end by a butoxy group. This organosilicone fluid is approximately 25% by weight silicone and 75% by weight polyol, and has a specific gravity of 1.03 at 25° C., a pour point of −34° F., a flash point (COC) of 505° F., and the following viscosities (centistokes) at the specified temperatures: 900 at 77° F., 600 at 100° F., and 90 at 210° F.

The air resistance values set forth in the table are indicative of the filtering qualities of the structures tested in an appraisal wherein an air resistance value of less than 2 is necessary for gas filtration media and a value of one or less is preferred. Another essential characteristic of filtering media is bodily integrity in that the structure existing after leaching must be integral and preferably rigid enough to span openings of 20 or more inches with a minimum of support or attaching means. In this regard, all of the samples treated according to the invention exhibited a highly satisfactory integrity and rigidity.

As may be observed from the table, a degree of leaching satisfactory for the fabrication of filtering media is achieved with the methods and materials of the invention in a leaching period of 5 to 7 minutes. However, with a straight alkaline leaching composition, leaching periods of from 2 to 3 times as long achieved widely divergent results which were in no instance as effective as those achieved by the invention. The discrepancy in the leaching results obtained at the same temperature and in the same alkaline leaching compositions are indicative of the process instability which plagues the alkaline leaching technique. In any event, even the greatest degree of leaching achieved with the straight alkaline leaching compositions, as evidenced by the air resistance values, is much less than the degree attained with the materials and methods of the invention at the same temperature and in one-third to one-half the time.

In addition, it should be noted that the air resistance of the samples treated according to the invention varies only 0.24 inch among the four samples thus treated, while the resistance of the alkaline leached materials vary at least 4.28 inches and probably more since the figure of 5 inches of air resistance represents the maximum reading upon the apparatus employed rather than the actual resistance in those instances where a reading of five was obtained.

The following examples serve to indicate the efficacy of the methods and materials of the invention upon polyester based polyurethane resin foams:

*Example 5*

A sample of a polyester based closed cell polyurethane foam was immersed in a 1.25% solution of sodium hydroxide in ethylene glycol for 60 minutes at 30° C. The leaching effect upon the foam was negligible.

*Example 6*

Example 5 was repeated employing a temperature of 80° C. for 5 minutes. The foam was completely dissolved under these conditions.

*Example 7*

Example 5 was repeated with another foam sample at 75° C. for 4 minutes. This treatment serves to effectively remove the closed cells of the foam. However, the integrity of the leached foam, although adequate, was less satisfactory than that previously achieved with alkaline-hydroxy compositions.

*Example 8*

The treatment of Example 5 was repeated at 60° C. for a period of 5 minutes. The leaching achieved and the product attained were superior to those of Example 7 and the integrity of the leached structure was entirely satisfactory.

*Examples 9–12*

The temperature and time conditions of Examples 5–8 were duplicated with the same type of foam, but with the utilization of a 1.25% solution of sodium hydroxide in glycerin. The leaching results attained were similar to those in Examples 5–8 with the exception that the solutions were not so violent in their action at elevated temperatures e.g. 75 and 85°.

*Example 13*

In order to determine whether the hydroxy compounds per se exhibit a leaching effect in the absence of alkaline material, a sample of the polyester based foam employed in Examples 5 through 12 was treated in the bath of ethylene glycol at a temperature of 120° C. for a period of 15 minutes without a noticeable effect upon the foam structure.

The polyester-based polyurethane utilized in Examples 5 through 13 was prepared from the following ingredients as expressed in parts by weight:

| | |
|---|---|
| Polyester resin | 100 |
| Toluene diisocyanate | Stoichiometric+5% |
| Water | 2.5 |
| N-methyl morpholine | 1.2 |
| Witco 77–86 (surfactant coupler) | 2.0 |

The polyester employed is a condensation product of adipic acid and a glycol and is cross-linked by the morpholine catalyst and the polyisocyanate.

It is apparent that by means of the methods and materials of the invention, an improved leaching is achieved. Through these methods and materials, the leaching of polyurethane foams at moderate temperatures and in short periods is made possible. In addition, uniform leaching under the same conditions may be achieved and the resultant leached structures exhibit adequate porosity and integrity for utilizations such as filtering media or absorbent structures when these qualities are necessary.

Witco 77–86 is a surfactant-emulsifier comprising the reaction product of an unsaturated fatty acid and ethylene oxide (70%), a sulfonated oil (15%) and an alkyl naphthenate (15%), and has a pH of 3.0–4.0 (3% aqueous dispersion), an acid number of approximately 14, and a specific gravity of 1.01.

Filters or absorbent structures prepared by this method may be leached and formed, cut or shaped to the desired dimensions or they may be formed in the desired shape and then leached to the extent necessary for the use to which they are to be put. The leached structures may be employed alone or in conjunction with frames, supporting or attaching means and are particularly useful in the gas filtration applications such as in furnace or air conditioning filters. In such useage, the filters may be further enhanced by coating with dust-catching media or coating such as oils or permanently tacky resins or adhesives or with germicidal materials. A further advantage of the leached foam materials is their ability to be compression packed in tight rolls or receptacles thereby conserving storage and shipping space and packaging materials.

It is obvious that various changes, alterations and substitutions may be made in the materials, methods and compositions of the present invention without departing from the spirit of the invention as defined by the following claims.

We claim:

1. A method for leaching a polyurethane foam comprising contacting the cell walls of a foam prepared by reacting an organic polyisocyanate and a compound selected from the group consisting of polyesters and polyethers for a time sufficient to exert a leaching effect upon said cell walls and to remove said cell walls, with a leaching composition consisting essentially of an alkaline solution and a hydroxyl substituted aliphatic hydrocarbon, said aliphatic hydrocarbon being present in a ratio of no more than one part by weight for each part by weight of said alkaline solution.

2. A method as claimed in claim 1 in which said contacting of said leaching composition is accompanied by concurrent mechanical working of said foam.

3. A method as claimed in claim 1 in which said alkaline solution is sodium hydroxide.

4. A method as claimed in claim 1 in which said aliphatic hydrocarbon is methanol.

References Cited in the file of this patent

UNITED STATES PATENTS

| | | |
|---|---|---|
| 471,569 | Praray | Mar. 29, 1892 |
| 1,672,621 | Neller et al. | June 5, 1928 |
| 2,678,304 | Buchner et al. | May 11, 1954 |
| 2,755,209 | Duncan | July 17, 1956 |
| 2,839,478 | Wilms et al. | June 17, 1958 |
| 2,898,246 | Hannah | Aug. 4, 1959 |
| 2,900,278 | Powers et al. | Aug. 18, 1959 |
| 2,961,710 | Stark | Nov. 29, 1960 |

FOREIGN PATENTS

| | | |
|---|---|---|
| 789,481 | Great Britain | Jan. 22, 1958 |
| 1,176,044 | France | Nov. 17, 1958 |